No. 771,253.

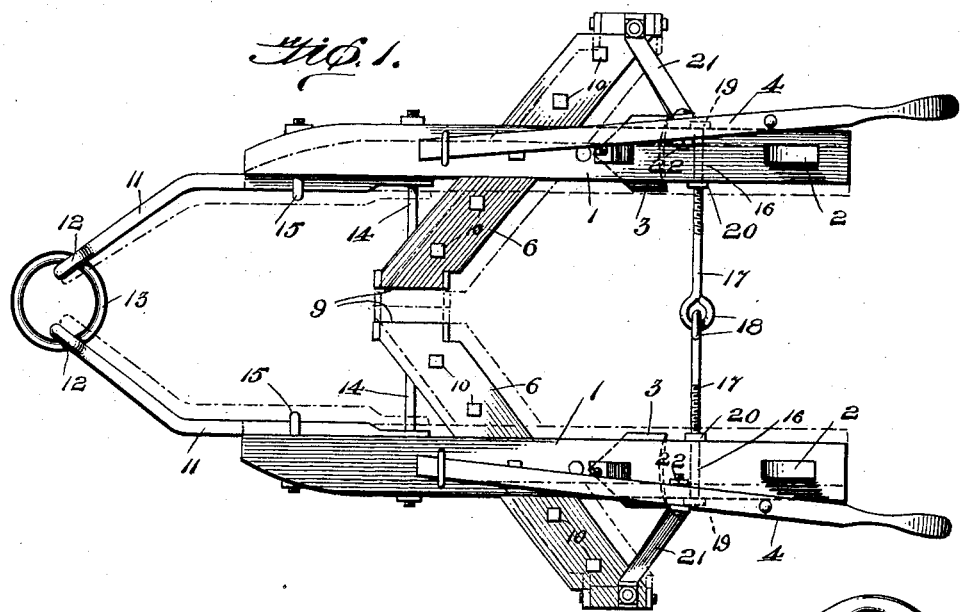
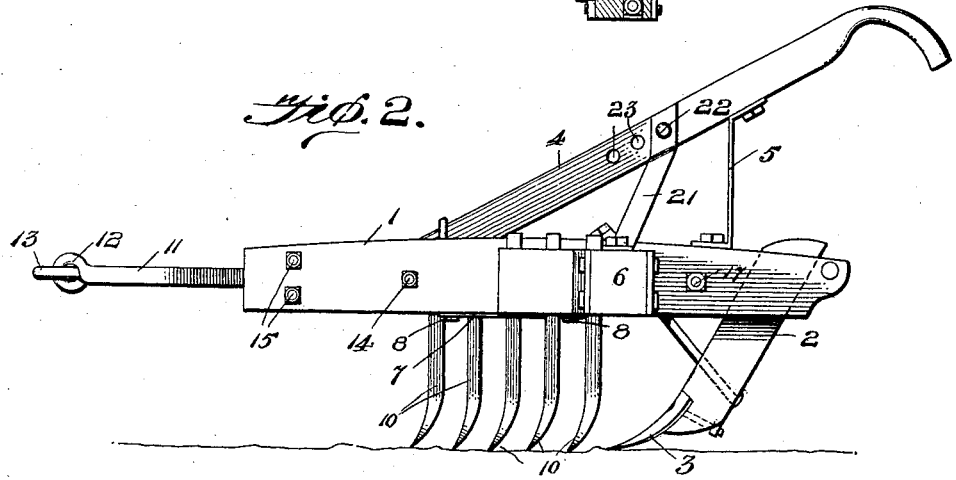
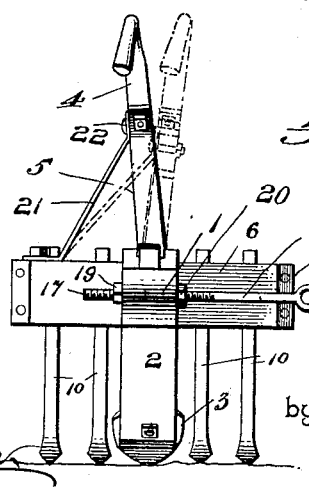

Patented October 4, 1904.

UNITED STATES PATENT OFFICE.

JAMES H. KELLER, OF PINSON, TENNESSEE.

COMBINED PLOW AND HARROW.

SPECIFICATION forming part of Letters Patent No. 771,253, dated October 4, 1904.

Application filed May 21, 1904. Serial No. 209,091. (No model.)

*To all whom it may concern:*

Be it known that I, JAMES H. KELLER, a citizen of the United States, residing at Pinson, in the county of Madison and State of Tennessee, have invented a new and useful Combined Plow and Harrow, of which the following is a specification.

This invention relates to agricultural implements for tilling and cultivating the soil.

The invention has special reference to an implement in which are incorporated harrows for stirring, leveling, and agitating the soil and furrow-openers for the purpose of opening furrows in the soil thus prepared or cultivating implements whereby a portion of the soil may be thrown to either side.

My improved implement contemplates the use of two plow-carrying beams, each provided with an obliquely-disposed harrow-tooth-carrying bar, said beams being suitably and adjustably connected in such a manner that the device may be conveniently adapted to various purposes.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of embodiment of the invention, it being understood, however, that no limitation is necessarily made to the precise structural details therein exhibited, but that the right is reserved to any changes, alterations, and modifications which come fairly within the scope of the invention and which may be resorted to without departing from the spirit or sacrificing the advantages of the same.

In said drawings, Figure 1 is a top plan view showing the side members of the device flexibly connected and with dotted lines indicating the relative position of the parts when the side members of the device have been drawn together, so as to be comparatively rigidly connected. Fig. 2 is a side elevation. Fig. 3 is a rear elevation of one of the plow-beams and related parts, full and dotted lines being used to indicate various positions of the handle.

Corresponding parts in the several figures are indicated by similar characters of reference.

In carrying out the present invention I provide a pair of plow-beams 1 1, each provided near its rear end with a downwardly and forwardly projecting standard 2, carrying a plow 3 of any suitable construction. To the upper sides of the beams 1 1 are secured handles 4, which are connected near their rear ends with the upper sides of the plow-beams by means of braces 5. Each of the plow-beams 1 carries an obliquely-disposed transverse bar 6, which is securely mortised thereto and connected therewith by means of a clip-plate 7, disposed upon the under side of the beam and bolts 8. The bars 6 6, carried by the two beams, converge in a forward direction and are provided at their forward terminals with parallel abutting faces 9. These obliquely-disposed bars constitute the harrow-bars and are provided with suitably-spaced harrow-teeth 10 of ordinary construction. Suitably secured to the inner sides of the plow-beams are forwardly-extending converging draft-beams 11, provided at their front ends with eyes 12, connected by a lap-ring or other suitable member 13. The draft members 11 are preferably secured to the beams by means of bolts 14 and clips 15. In rear of the obliquely-disposed harrow-bars the beams 1 1 are provided with transverse perforations 16 for the passage of screw-threaded rods 17, the inner ends of which are provided with eyes 18, linked together. Said screw-threaded rods are provided with lock-nuts 19 and 20, which are disposed adjacent to, respectively, the outer and the inner sides of the beams, which latter by adjusting the said lock-nuts may be spread apart or drawn together, as may be desired. It is obvious that when the beams are thus spread apart they may be freely operated independently of each other. Thus when during the progress of the machine a stump or other obstacle shall be encountered which would lie in the path of one of the members of the device such member may be readily lifted out of the way while passing over such obstruction, while the other member is permitted to continue uninterruptedly upon its course. Again, when thus flexibly connected the harrow members of the device will be enabled to operate successfully upon opposite sides of a hill or ridge. When the device is thus used, it may be found desirable to remove the plow-carrying standards, which may be readily done, said standards being secured in position in a manner which will admit of their being readily removed when desired. When it is desired to use the device as a rigid V-shaped harrow, the adjusting-nuts 19 and 20 are adjusted upon the link-rods 17 in such a manner as to bring the rear ends of the beams in the direction of each other until the abutting faces 9 9 of the harrow-bars abut closely upon each other, when a perfectly rigid implement will be produced.

Auxiliary braces 21 are employed for connecting the handles 4 adjustably with the outer ends of the harrow-bars 6. When the beams are spread apart, it will be found sometimes desirable to raise the handles, and this may be accomplished by proper adjustment of the bolts 22, whereby the brace members are connected with the handle-bars in perforations 23, nearer the front ends of the latter.

As will be seen from the foregoing description, this device is extremely simple in construction and is calculated to be made in a durable and wear-proof manner. The device will readily lend itself to a variety of adjustments, whereby it will be specially adapted for different classes of work, as will be readily understood by those skilled in the art to which it appertains.

Having thus described the invention, what is claimed is—

1. A pair of plow-beams, harrow-bars connected obliquely with the same, converging forwardly in the direction of each other and having abutting faces, draft members connected with the inner sides of the beams, converging forwardly and connected by a link at their front ends, and means for adjustably connecting the rear ends of the plow-beams to bring the abutting ends of the harrow-bars into contact with each other when desired.

2. A pair of plow-beams, harrow-tooth-carrying bars connected obliquely with said beams and converging inwardly and forwardly, forwardly-converging draft members connected with the plow-beams, plow-carrying standards mounted detachably at the rear ends of the beams, means for adjustably connecting the rear ends of the beams, handles secured upon the beams, and braces connecting said handles with the beams.

3. A pair of plow-beams, harrow-tooth-carrying bars connected obliquely with said beams, flexible connecting means for the beams, handles mounted upon the beams, and braces connected with the outer ends of the tooth-carrying bars and having adjustable connection with the handles.

In testimony that I claim the foregoing as my own I have hereto affixed my signature in the presence of two witnesses.

JAMES H. KELLER.

Witnesses:
J. G. CARTER,
E. M. BROWN.